United States Patent
Lopata et al.

(10) Patent No.: US 7,738,598 B1
(45) Date of Patent: Jun. 15, 2010

(54) DETECTION AND TIME-OF-ARRIVAL ESTIMATION USING AN IFM RECEIVER

(75) Inventors: Stuart M. Lopata, Palisades Park, NJ (US); James B. Y. Tsui, Dayton, OH (US); Maan J. Broadstock, Dayton, OH (US); Charles R. Ward, Wellsboro, PA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 928 days.

(21) Appl. No.: 11/521,822

(22) Filed: Sep. 15, 2006

(51) Int. Cl.
*H03K 9/00* (2006.01)
(52) U.S. Cl. ............... 375/316; 702/75; 702/76; 702/77; 342/196
(58) Field of Classification Search ............ 375/316; 342/196, 13; 702/75, 76, 77
See application file for complete search history.

(56) References Cited

U.S. PATENT DOCUMENTS

| | | | |
|---|---|---|---|
| 4,336,541 A | 6/1982 | Tsui et al. | |
| 4,426,648 A | 1/1984 | Tsui et al. | |
| 4,547,727 A | 10/1985 | Tsui et al. | |
| 4,633,516 A | 12/1986 | Tsui et al. | |
| 5,291,125 A | 3/1994 | Tsui et al. | |
| 5,499,391 A | 3/1996 | Tsui | |
| 5,963,164 A * | 10/1999 | Tsui et al. | 342/196 |
| 6,411,076 B1 | 6/2002 | Rudish | |
| 6,501,258 B1 * | 12/2002 | Levitt et al. | 324/76.37 |

* cited by examiner

*Primary Examiner*—Mohammad H Ghayour
*Assistant Examiner*—Leila Malek
(74) *Attorney, Agent, or Firm*—RatnerPrestia

(57) ABSTRACT

An instantaneous frequency measurement (IFM) receiver includes a receiver module for determining a frequency $f_e$ of a received signal. Also included is a discrete Fourier transform (DFT) module configured to sum values of digital samples of data in a block of data, wherein the values of the digital samples of data are based on the frequency $f_e$. A confirmation module confirms the frequency $f_e$, if the sum has a value greater than a predetermined threshold. The DFT module is configured to obtain the sum of N-sample points of data which are disposed in the block of data by using a DFT kernel function.

14 Claims, 11 Drawing Sheets

US 7,738,598 B1

DETECTION AND TIME-OF-ARRIVAL ESTIMATION USING AN IFM RECEIVER

TECHNICAL FIELD

The present invention relates, in general, to an instantaneous frequency measurement (IFM) receiver. More specifically, the present invention relates to a method and apparatus for (1) confirming that the instantaneous frequency of a received signal having been measured by an IFM receiver is correct, (2) estimating the time-of-arrival of that signal, and (3) measuring the pulse width of that signal.

BACKGROUND OF THE INVENTION

Electronic surveillance measurement (ESM) receivers commonly require that frequency calculations be performed on a received signal from targets of interest. The frequency of an input signal is often measured using an instantaneous frequency measurement (IFM) receiver. The IFM receiver, generally, uses a difference in phase between a delayed and a non-delayed version of an input signal to calculate the frequency of the input signal.

The IFM receiver may cover a wide input frequency range such as, for example, a range from 2 GHz to 18 GHz. The receiver may process short pulse widths and obtain good frequency accuracy. A conventional IFM receiver may be built through analog means with frequency correlators. The advancement in digital signal processing techniques has resulted in IFM receiver approaches with a one bit digitized signal. An example of an IFM receiver with a one bit digitized signal is disclosed in U.S. patent application Ser. No. 11/170,121, filed on Jun. 29, 2005, which is incorporated herein by reference in its entirety for its teachings on instantaneous frequency measurements.

It is important to be able to confirm that the measurement of frequency by an IFM receiver is correct. Presently, IFM receivers do not do this directly, but rather, try to detect a variety of conditions that could lead to an incorrect measurement. An example of an IFM receiver with frequency confirmation is disclosed in U.S. patent application Ser. No. 11/270,096, filed on Nov. 9, 2005, which is incorporated herein by reference in its entirety for its teachings on instantaneous frequency measurements and its subsequent frequency confirmation.

The present invention provides another technique for directly confirming the frequency measurement of a signal received by an IFM receiver. In addition, the present invention provides a technique for measuring the width of a pulse received by the IFM receiver and also estimating the time-of-arrival (TOA) of that pulse.

SUMMARY OF THE INVENTION

To meet this and other needs, and in view of its purposes, the present invention provides an apparatus for confirming a frequency measurement of a received signal. The apparatus includes a receiver for measuring a frequency, $f_e$, of a received signal; a sampling module for sampling the received signal to form digital samples of data; a dividing module for partitioning the digital samples of data into blocks of data; and a discrete Fourier transform (DFT) module configured to use a kernel function dependent on the frequency $f_e$. The DFT module is configured to sum the digital samples of data disposed in a block of data and provide a magnitude. A confirmation module is included for confirming the frequency, $f_e$, of the received signal, if the magnitude exceeds a predetermined threshold value.

The DFT module is configured to obtain the magnitude of the sum of N-sample points of data disposed in the block of data, according to the following equation:

$$X(k) = \sum_{n=0}^{N-1} x(n) e^{-j\frac{2\pi kn}{N}}$$

where $k=f_e$ n is an index for each digital sample, and

N is the number of digital samples in the block of data.

The DFT module is also configured to sum the digital samples of data disposed in a second and a third block of data following the first block of data and provide, respectively, a second magnitude and a third magnitude. The confirmation module confirms the frequency $f_e$, if the first magnitude exceeds the first predetermined threshold, and the second and third magnitudes each exceeds a second predetermined threshold. The first predetermined threshold is larger than the second predetermined threshold.

The receiver is configured to estimate the frequency $f_e$ of the received signal in a duration of 4 times the duration of the N-sample points. As an example, the N-sample points includes 64-points of data, and the receiver estimates the frequency $f_e$ in a duration of 256 sample points, or in a duration of four blocks of data, where the four blocks of data are defined as a frequency calculation interval.

The DFT module is configured to sequence through sequential blocks of data and obtain the magnitude of each of the blocks of data, and the first block of data in the sequence begins prior to the start of the frequency calculation interval. For example, the first block of data in the sequence may begin two blocks of data prior to the start of the frequency calculation interval.

The received signal includes a pulse having a leading edge and a trailing edge, and if the confirmation module confirms the frequency $f_e$ at the start of the frequency calculation interval, then the leading edge of the pulse is defined to be present during a block of data that is two blocks prior to the start of the frequency calculation interval. If the confirmation module does not confirm the frequency $f_e$ during one of the sequential blocks of data, after having confirmed the frequency $f_e$ prior to the one block of data, then the trailing edge of the pulse is defined to be present during the one block of data.

Another embodiment of the present invention is an instantaneous frequency measurement (IFM) receiver. The IFM receiver includes a receiver module for determining a frequency $f_e$ of a received signal; a discrete Fourier transform (DFT) module configured to sum values of digital samples of data in a block of data, wherein the values of the digital samples of data are based on the frequency $f_e$; and a confirmation module for confirming the frequency $f_e$, if the sum has a value greater than a predetermined threshold.

If the confirmation module of the IFM receiver confirms the frequency $f_e$ at one of the sequential blocks of data, then the leading edge of the pulse is defined to be present in a block of data that is prior to the one of the sequential blocks of data. If the confirmation module does not confirm the frequency $f_e$ during one of the sequential blocks of data, after having confirmed the frequency $f_e$ prior to the one block of data, then the trailing edge of the pulse is defined to be present during the one block of data.

Yet another embodiment of the present invention is a method of confirming an instantaneous frequency $f_e$ of a received signal. The method includes the steps of: (a) digitizing the received signal to form digital samples of data; (b) summing values of the digital samples of data in a block of data, wherein the values of the digital samples of data are based on the frequency $f_e$; and (c) confirming the frequency $f_e$, if the summed values of step (b) exceed a predetermined threshold value. Step (b) includes summing N-samples of data in one block of data, and separately summing N-samples of data in adjacent blocks of data. Step (c) includes confirming the frequency $f_e$, if the summed values of the one block of data exceed a first predetermined threshold value and if the summed values of an adjacent block of data exceed a second predetermined threshold value.

The method may further include: (d) determining a time-of-arrival (TOA) of the leading edge of the pulse, after confirming in step (c) the frequency $f_e$; and (e) determining a time of departure (TOD) of the trailing edge of the pulse, after determining the TOA in step (d) and after not confirming the frequency $f_e$ in step (c).

Step (b) of the method includes summing values of the digital samples of data in the block of data using the following formula:

$$X(k) = \sum_{n=0}^{N-1} x(n)e^{-j\frac{2\pi kn}{N}}$$

where $k=f_e$, n is an index for each digital sample, and

N is the number of digital samples in the block of data.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention provides frequency confirmation for a measurement performed by an IFM receiver. In addition, the present invention provides a system and method for measuring the pulse width and time-of-arrival (TOA) of the same signal whose frequency has been confirmed by the IFM receiver. The present invention advantageously eliminates the need for crystal video receivers which are conventionally used to convert a received RF input signal into a video signal.

The present invention may be implemented, for example, in a field programmable gate array (FPGA), or a digital signal processor (DSP). The present invention may be integrated with a digital IFM receiver, such as disclosed in U.S. patent application Ser. No. 11/270,096, filed on Nov. 9, 2005, by the inventors of the present application. In another embodiment, the present invention may be implemented in a separate unit, or module, from the digital IFM receiver.

An IFM receiver may cover a wide input frequency range from 2 GHz to 18 GHz. It may process short pulse widths with good frequency accuracy. The IFM receiver may be built through analog techniques using frequency correlators. The IFM receiver may also be built using digital signal processing modules, such as the one bit analog-to-digital converters (ADCs) shown in FIG. 1, which is described in more detail later. The one bit ADCs are used because of simplicity. Other configurations may also be used.

It will be appreciated that IFM receivers (analog or digital) may generate erroneous frequency data when there are simultaneous signals presented at the input of the IFM receiver. If simultaneous signals are present, the frequency measurement from the IFM receiver may be questionable. For example, when simultaneous signals exist, the IFM receiver may generate a correct frequency for only one of the input signals. Thus, the frequency generated by the IFM receiver is not positively confirmed as a correct or incorrect frequency. It is also important to know when the frequency estimated by the IFM receiver is incorrect. In the field of IFM receivers, it has been difficult to identify an erroneous frequency.

Figure 1:
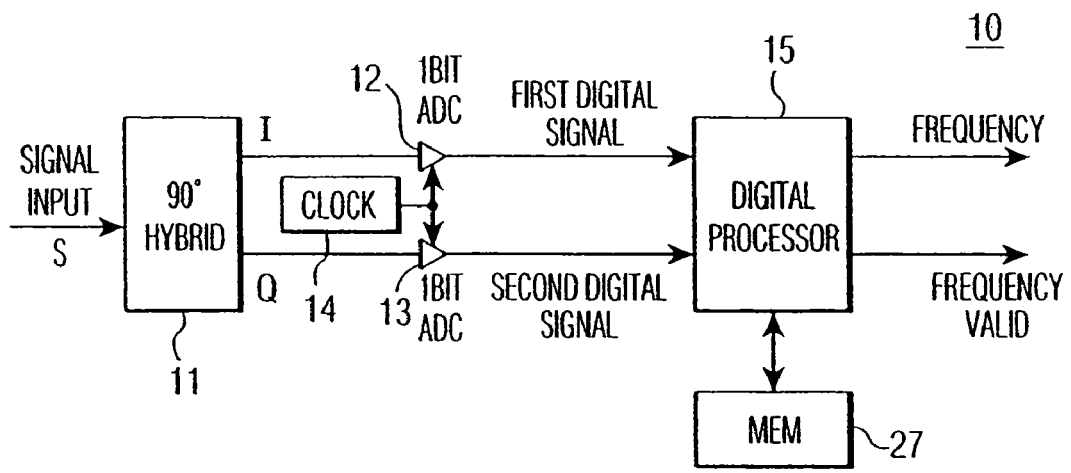
FIG. 1 is a block diagram of a digital IFM receiver having two one-bit analog-to-digital converters (ADCs) and a digital processor for executing an embodiment of the present invention.

FIG. 1 shows a block diagram of a digital IFM receiver, in accordance with an embodiment of the present invention, generally designated as 10. As shown, IFM receiver 10 includes two-one bit ADCs, generally designated as 12 and 13. The input signal, designated as S, received by IFM receiver 10 may be a radio frequency (RF) signal or a down-converted intermediate frequency (IF) signal. The input signal is of an unknown frequency. IFM receiver 10 is configured to perform at least four functions, namely (1) determine the input frequency, (2) confirm the input frequency determined in (1), (3) determine the TOA of the input signal, and (4) determine the pulse width of the input signal.

As shown, the received signal passes through a 90° hybrid, generally designated as 11, to form a first analog, in-phase signal I and a second analog, quadrature signal Q. The second analog signal I is shifted in phase from the first analog signal Q by 90°. One bit ADC 12 converts the first analog signal I into a first digital signal. The other one bit ADC 13 converts the second analog signal Q into a second digital signal. The first and second digital signals are provided to digital processor 15, which determines the input frequency of the received signal.

Generally, an IFM receiver, such as receiver 10, covers a wide bandwidth, for example 2 GHz and more. In order to achieve such wide bandwidth, the sampling frequency of receiver 10 must be high. A high speed ADC having a low number of bits is used to achieve speed when sampling the input signal. As such, ADC 12 and ADC 13 are each a one bit analog-to-digital converter. It will be appreciated that one bit ADCs are available that operate at speeds of tens of GHz in sampling a signal.

In order to cover an even wider bandwidth, an in-phase (I) and a quadrature (Q) approach is used by the exemplary embodiment shown in FIG. 1. Accordingly, the input signal is split into two paths, through the 90° hybrid, to form the I signal and the Q signal. The in-phase and quadrature signals are out of phase with respect to each other by 90 degrees.

IFM receiver 10 is configured to provide the phase angle of the input signal at every sampling time, as sampled by clock 14. The ADC 12 and ADC 13 are each sampled by clock 14 in a manner that is similar to a D-type flip flop providing an output Q signal every sample period. One-bit ADC 12 digitizes the analog I signal to form a sampled $I_D$ signal, and one-bit ADC 13 digitizes the analog Q signal to form a sampled $Q_D$ signal. This advantageously simplifies the signal processing required by IFM receiver 10.

In order to cover the desired 2 GHz bandwidth, for example, a sampling frequency of 2.56 GHz (2560 MHz) is used by clock 14. A corresponding sampling time of 1τ is about 0.39 ns (1/2.56 GHz), which is the inverse of the sampling frequency. The sampling time of it may be used as the shortest delay time in the IFM receiver. It will be appreciated that one bit ADCs are available at sampling speeds of up to 50 giga-samples per second (GSPS), allowing the IFM receiver to process very wide bandwidth input signals. Other sampling times may also be used, such as 2τ, 4τ, 8τ, 16τ, 32τ, and/or 64τ, and more. Since all these sampling times are multiples of one sampling time interval (1τ), there is no special timing adjustment that must be made by IFM receiver 10. All of these sampling times, if necessary, may be executed by digital processor 15.

Digital processor 15 provides the delay times to find the phase difference between the received input signal and its delayed version. This phase difference is used to find the frequency of the received input signal. The delay time provided by digital processor 15 is the interval between various sampling times. According to the above example, the shortest delay time equals one sampling time interval 1τ, which is 0.39 ns. Longer delay times may equal multiples of the one sampling time interval 1τ, namely 2τ, 4τ, 8τ, 16τ, 32τ, 64τ, etc.

As also shown in FIG. 1, the IFM receiver includes an estimated frequency signal, which identifies the frequency of input signal S, and a frequency valid signal, which is used as a frequency confirmation of the estimated frequency signal. Both signals are outputted from digital processor 15 which interfaces with memory section 27. More description of how digital processor 15 estimates the frequency of input signal S may be found in application Ser. No. 11/170,121, filed on Jun. 29, 2005, by the same inventors, which is incorporated herein by reference in its entirety.

Figure 2:
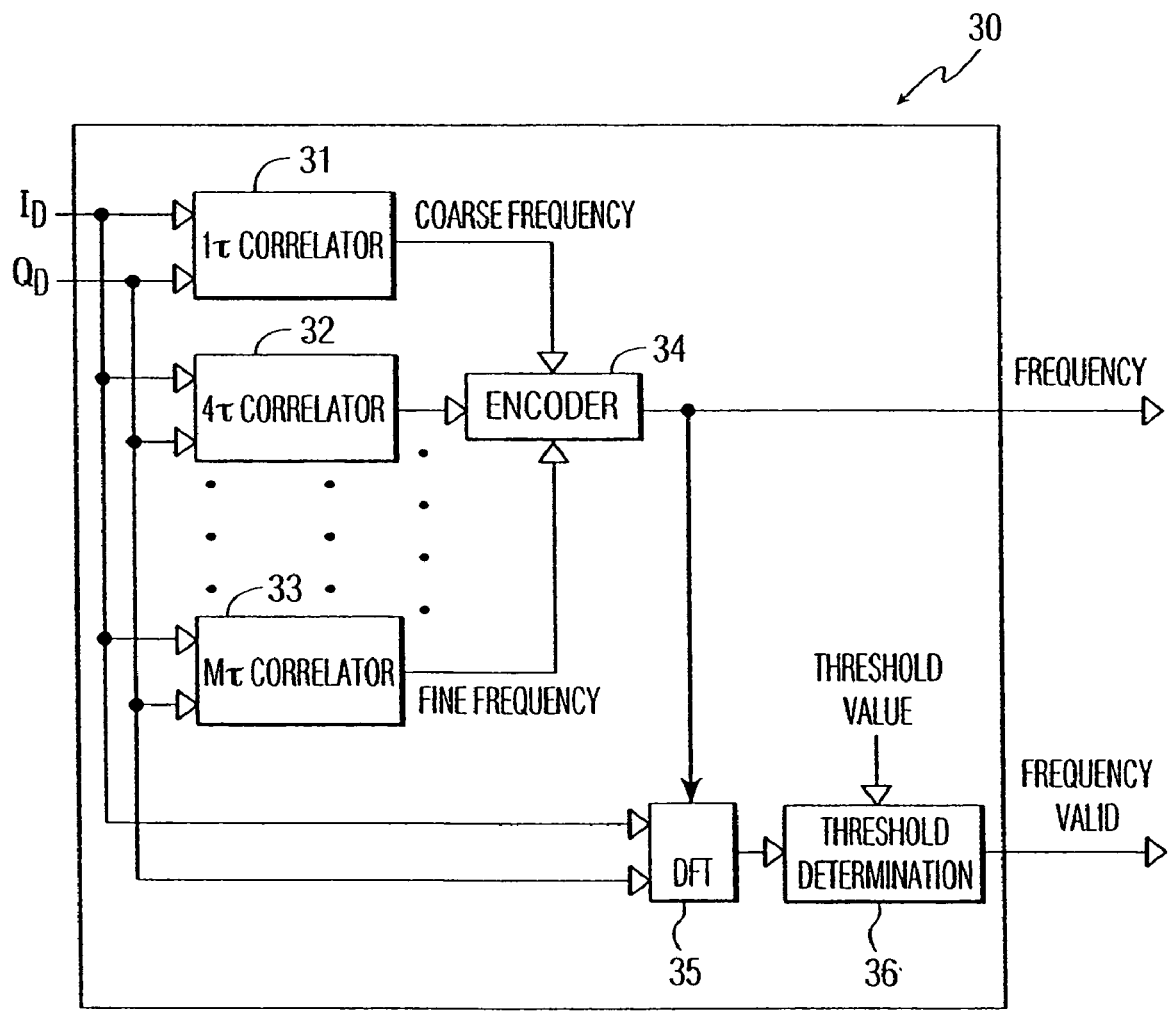
FIG. 2 is a block diagram of a processing module implemented in the digital processor shown in FIG. 1, in accordance with an embodiment of the present invention.

Digital processor 15 may include processing module 30 shown in FIG. 2. As shown, a sampled in-phase $I_D$ signal and a sampled quadrature $Q_D$ signal are received by digital processor 30. The $I_D$ and $Q_D$ signals are divided and applied to M correlators (three correlators are shown designated as 31, 32, and 33). Each correlator is processed to include a different delay time. The shortest delay time is equal to one sampling time interval of 1τ, and the longer delay times are each made equal to a multiple of the one sampling time interval of 1τ, such as 2τ, 4τ, 8τ, 16τ, 32τ, 64τ, etc. Furthermore, each correlator includes undelayed inputs of the $I_D$ and $Q_D$ signals.

The correlators produce outputs that are the sine and cosine of the product of the input frequency and the delay time. The sine and cosine outputs from the correlators are then used by a parameter encoder, designated as 34, to report the estimated frequency at the output of digital processor 30.

Also shown in FIG. 2 is the frequency confirmation process performed by the present invention. As shown, a discrete Fourier Transform (DFT), designated as 35, receives the input $I_D$ and $Q_D$ signals. The processed output of the DFT is then compared against a predetermined threshold value by a comparator, designated as 36. If any of the outputs of the DFT exceeds the predetermined threshold value, a frequency valid signal is outputted from comparator 36. The manner in which this frequency confirmation process is performed is described below.

As an example, for explanation purposes below, it is assumed that the bandwidth of IFM receiver 10 is about 2000 MHz and the sampling frequency, fs, of the 1-bit ADCs is 2560 MHz. The IFM receiver may actually perform satisfactorily from very low frequency up to 2560 MHz.

A special form of the DFT (Discrete Fourier Transform) process may be used to confirm the frequency estimated by the IFM receiver. This special form of the DFT process may be defined by equation (1):

$$X(k) = \sum_{n=0}^{N-1} x(n)e^{-\frac{j2\pi kn}{N}} \quad (1)$$

where N is the total number of time samples used in the calculation, n is an index for each time sample, k is a frequency index which for this special form takes on any one of the k values equally spaced between zero and the sampling frequency. The second expression in the above equation, the exponential term, is referred to as the DFT "kernel" function.

The general form of the DFT kernel function has, in the above example, 256 by 256 elements, because the general DFT may use 256 input sample points and the output of the DFT may have 256 frequency components.

Generally, the number of input time samples may be chosen to be as large as possible to maximize processing gain. Preferably, the number of input time samples chosen is never greater than the minimum pulse width of the received signal that the IFM must process. The number of frequency components may be determined by the required frequency resolution of the IFM receiver. Therefore, 256 squared, or 65,536 calculations may be required to compute a complete general DFT. An example of this special kernel function matrix is shown in Equation 2.

$$\text{Kernel} = \begin{bmatrix} \overbrace{\begin{matrix} q_{1,1} & q_{1,2} & q_{1,3} & \cdots & q_{1,256} \\ q_{2,1} & q_{2,2} & q_{2,3} & \cdots & q_{2,256} \\ & & \vdots & & \\ q_{256,1} & q_{256,2} & q_{256,3} & \cdots & q_{256,256} \end{matrix}}^{k \text{ frequency components}} \end{bmatrix} \Big\} \text{time} \qquad (2)$$

In this general DFT kernel function matrix, the elements may have values as defined in Equation 3. These elements represent N unity magnitude vectors equally spaced about a unit circle.

$$q_{k,n} = e^{-\frac{j2\pi kn}{N}} \qquad (3)$$

The elements in the DFT kernel matrix may be quantized to only four allowable phase angles corresponding to 0, 90, 180 and 270 degrees. Any element greater than or equal to $7\pi/4$ degrees and less than $\pi/4$ degrees may be assigned a phase angle of 0 degrees. Any element greater than or equal to $\pi/4$ and less than $3\pi/4$ may be assigned a phase angle of 90 degrees. Any element greater than or equal to $3\pi/4$ and less than $5\pi/4$ may be assigned a phase angle of 180 degrees. Any element greater than or equal to $5\pi/4$ and less than $7\pi/4$ may be assigned a phase angle of 270 degrees.

Using complex number representation, each of the q elements in the matrix may have four values: 1, −1, j, and −j, where j is $\sqrt{-1}$. The matrix multiplication operation, which may be used to determine all the frequency components of an input signal, is shown below in Equation 4. The operation in Equation (4) is easy to implement, because there is no multiplication required.

$$X(k) = [n_1 \; n_2 \; n_3 \; \ldots \; n_{256}] \begin{bmatrix} \overbrace{\begin{matrix} q_{1,1} & q_{1,2} & q_{1,3} & \cdots & q_{1,256} \\ q_{2,1} & q_{2,2} & q_{2,3} & \cdots & q_{2,256} \\ & & \vdots & & \\ q_{256,1} & q_{256,2} & q_{256,3} & \cdots & q_{256,256} \end{matrix}}^{k \text{ frequency components}} \end{bmatrix} \qquad (4)$$

where $n_1, n_2, \ldots n_{256}$ are the input data sample points, and k is a frequency component.

According to an embodiment of the present invention, it is not necessary to calculate all the DFT frequency components from the monobit receiver of FIG. 1 in order to confirm the existence of a frequency. It is contemplated that only one frequency component (or two frequency components, if two simultaneous signals are present) needs to be confirmed by the present invention. In other words, if the monobit receiver of FIG. 1 determines that an input signal has a frequency component corresponding to $f_o$, then the present invention only needs to confirm the presence or absence of a frequency corresponding to $f_o$.

When confirming the presence or absence of one specific frequency component, the present invention uses only 64 input sample points (for example) with values of only one column of ±1s or ±js (corresponding to a specific frequency index of k in the DFT matrix) and summing the results. If the summed output is above a predetermined threshold, then the output is determined to be a correct frequency.

In this approach, the confirmation test performed by processing module 30, or digital processor 15 of the present invention uses only 64 points of sampled data instead of the 256 points used for confirmation by the system described in U.S. patent application Ser. No. 11/270,096, filed on Nov. 9, 2005, by the same set of inventors. The confirmation performed by the present invention only uses one frequency component of the discrete Fourier Transform (DFT) outputs. This is different from the previously filed patent application, in which three, 256 point sequences are used for confirmation at three (the IFM measured frequency and one DFT bin on either side of the measured frequency) frequencies. The confirmation method used by the present invention is computationally more efficient, and has an added benefit of resolving TOA to 25 ns rather than 100 ns.

The measured frequency value, $f_o$, of the IFM receiver is used in the DFT calculation. The confirmation operation for the first 64 points is given by equation (5):

$$X(f_o) = \sum_{n=0}^{63} x(n) e^{-j\frac{2\pi f_o n}{N}} \qquad (5)$$

Figure 3:
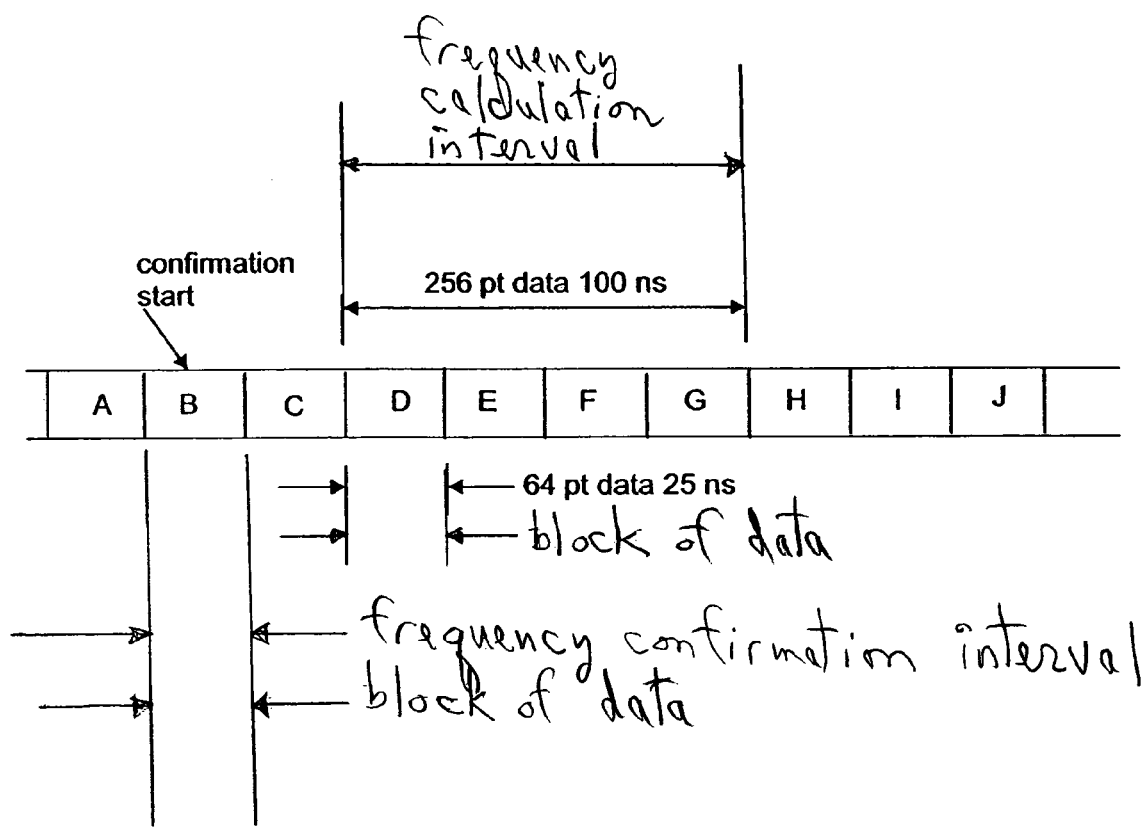
FIG. 3 is a sequence of blocks of data, where each block of data includes 64 sampling points, in accordance with an embodiment of the present invention.

This is a one component discrete Fourier Transform (DFT). In this equation, it should be noted that the $f_o$ value is not required to be an integer; it is the frequency measured by IFM receiver 10 that is $k=f_o$. When one block of data (64 points) confirms the signal, as shown in FIG. 3, the input signal is detected and the TOA is assigned as the beginning of the block and the time resolution is 25 ns. Referring to FIG. 3, four blocks of sampled data (for example block D, E, F and G) during 100 ns time interval are used to calculate (or measure) the frequency of $f_o$.

Since in Equation (5) the input x(n) only has one bit, it is reasonable to change the kernel function into one bit. Therefore, the kernel function $e^{-j2\pi f_o n/N}$ only has four values: ±1 and ±j. This is representative of the actual processing in IFM receiver 10.

In order to confirm the existence of a signal, a threshold is set by the present invention. The threshold is set from the fast Fourier Transform (FFT) operation of $$X(k) = \sum_{n=0}^{63} x(n) e^{-j\frac{2\pi kn}{N}} \qquad (6)$$

In equation (6), the k is an integer number from k=0 to 63, x(n) has only one bit (each for the in-phase and quadrature phase paths). The x(n) is generated from input noise when no input signal is present, and $e^{-j2\pi kn/N}$ still has only four values of ±1 and ±j. This operation may be carried out for one thousand simulated trials (for example) and the highest computed value in the frequency domain may be used as the threshold. Thus, the probability of false alarm is about $10^{-3}$. The threshold value is about 38 from such a simulation.

Referring now to FIG. 3, each block of data, designated as A, B, C, . . . contains 64 points of data. If a frequency is estimated from 256 points of data (the present four blocks from D to G), the confirmation may start from block B (one of the previous four blocks of 256 points of data), because there is a possibility that the signal started at that time, but was undetected in the previous four blocks of 256 points. If block B is not confirmed, then each of blocks C, D, G are sequentially tried. If all the blocks are not confirmed, the signal is not found.

If any block is confirmed (thus, possibly finding the leading edge of the pulse), the following blocks are then tested to find if the trailing edge of the pulse is present, thereby allowing calculation of the pulse width. When the following block is not confirmed, the trailing edge of the pulse is likely present in that block. Accordingly, the time of departure, TOD, is assigned to the beginning of that block. The difference between TOD (trailing edge of the pulse) and TOA (leading edge of the pulse) is calculated as the pulse width.

Alternative search strategies may also be used. For example, one can start the confirmation from block D. If block D is confirmed then block C is tested. If block C is confirmed, then block B is tested. Even if block B is confirmed, block A is not tested, because if the signal starts at A, the previous 256 points should have determined the correct frequency. Then the test for blocks E, F, ... follows to find the pulse width.

The following is a discussion of a hysteresis threshold setting implemented by the present invention. If the first block is confirmed (for example block E), the following blocks F, G are tested. However, the threshold for these two blocks are slightly lowered by about 2 dB (to about 31) from the original threshold of 38. This adjustment is needed because when the signal is weak, the following block may not cross the threshold. If this occurs, the signal will be chopped into small pieces. By lowering the threshold for the following blocks after the first detected block, the present invention avoids this problem.

As previously described, the probability of false alarm is about $10^{-3}$. This is a very high number for use in an EW receiver design. The present invention, therefore, uses three (or four) consecutive tests to declare a signal. If the first block is falsely confirmed, the chance of the following blocks also being falsely confirmed is small. Thus, the overall false alarm rate is reduced. However, the probability of false alarm is not $10^{-9}$ ($10^{-3}*10^{-3}*10^{-3}$) but higher than this value, because the threshold setting used in the following two blocks are set lower than the first block.

Figure 4:
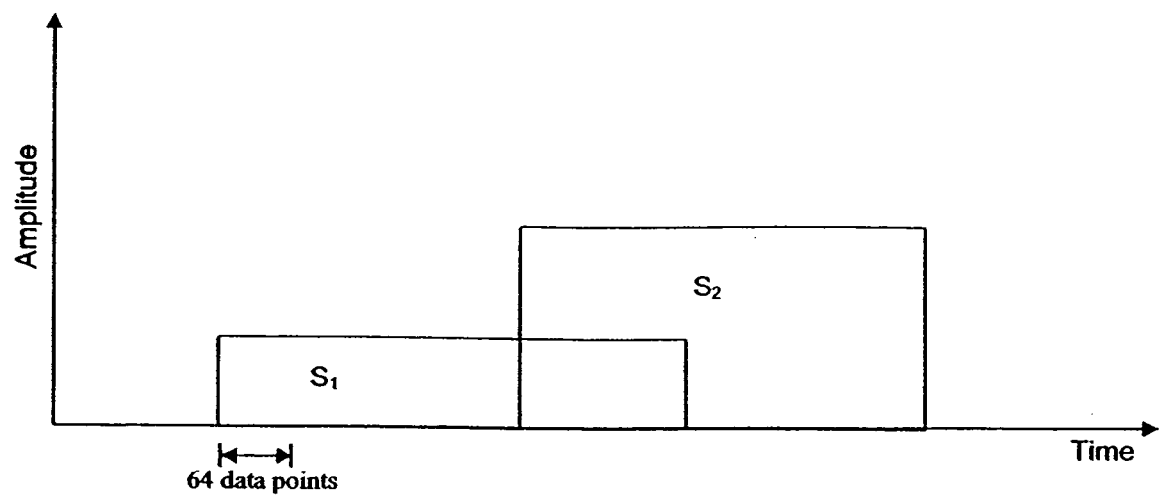
FIG. 4 is a plot of amplitude versus time showing two received signals which partially overlap each other.

Referring next to FIG. 4, there is shown a simple pulse overlap condition. The first signal $s_1$ has a frequency $f_1$ and the second signal $s_2$ has a frequency $f_2$. The second signal is assumed to be stronger than the first signal. Also shown is one block of data (64 points). First, frequency $f_1$ is measured during the non-overlapping period. During the overlap period, frequency $f_2$ may be measured by IFM receiver 10, because the second signal is stronger. It is possible to perform confirmations on both $f_1$ and $f_2$ during the overlap period and both frequencies may cross the predetermined threshold. However, the receiver's capability on measuring two frequencies are quite limited. Since the input signal only has one bit, the input signal is hard limited. The strong signal will likely capture the weak signal. Even if the two signal strengths are comparable and the IFM receiver measures frequency $f_2$ during the overlap period correctly, the energy of the signals may, nevertheless, be reduced because of nonlinear effects between the two signals. In order to detect both signals, the threshold must be adjusted to accommodate the two signal condition.

Figure 5:
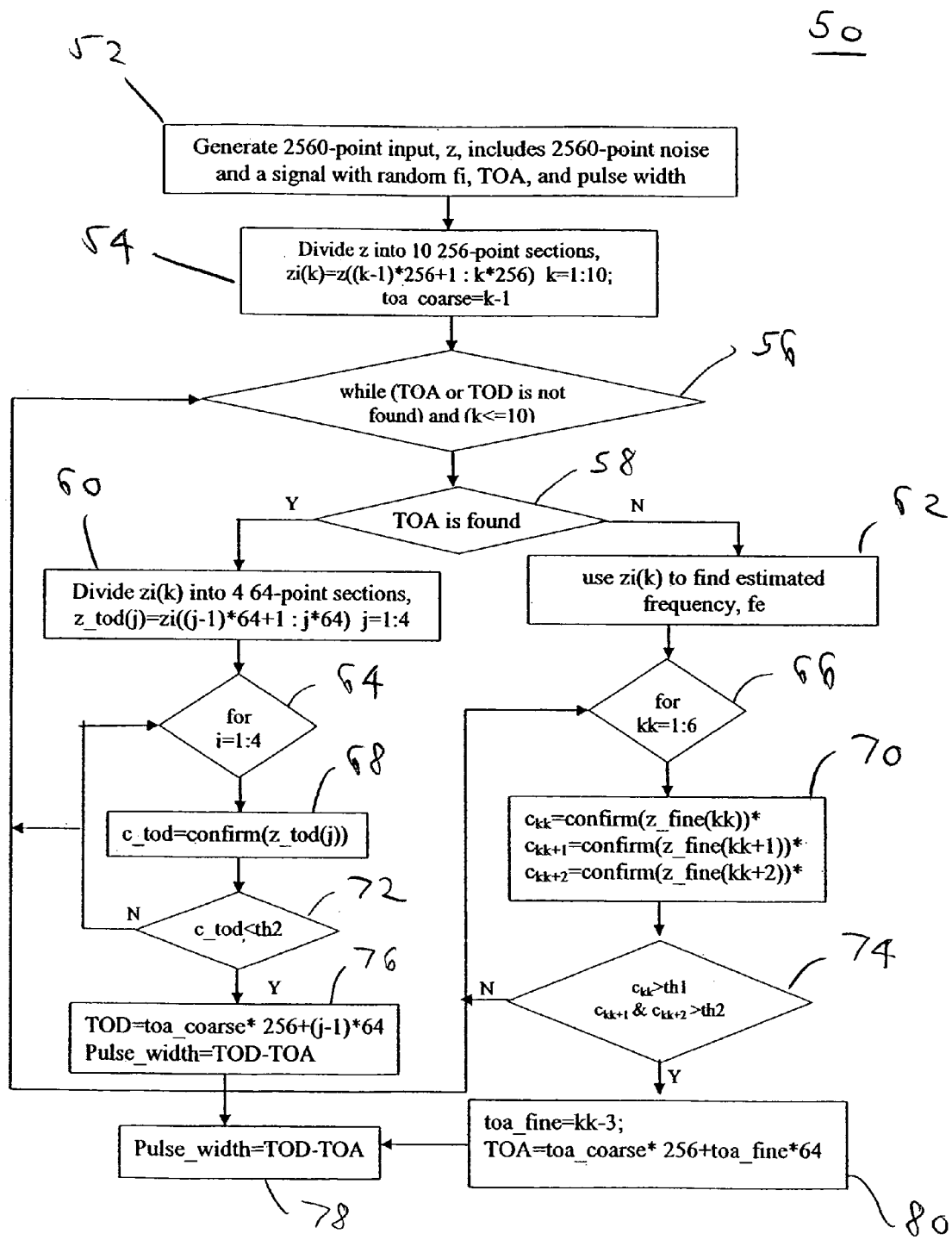
FIG. 5 is a method of the present invention as executed by the digital processor of the IFM receiver shown in FIG. 1, in accordance with an embodiment of the present invention.
Figure 6:
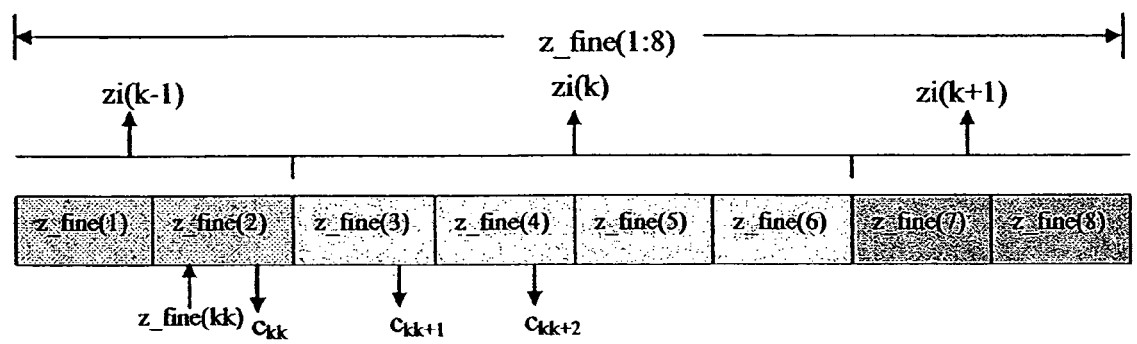
FIG. 6 is a sequence of blocks of data, as partitioned by the method shown in FIG. 5, in accordance with an embodiment of the present invention.
Figure 7:
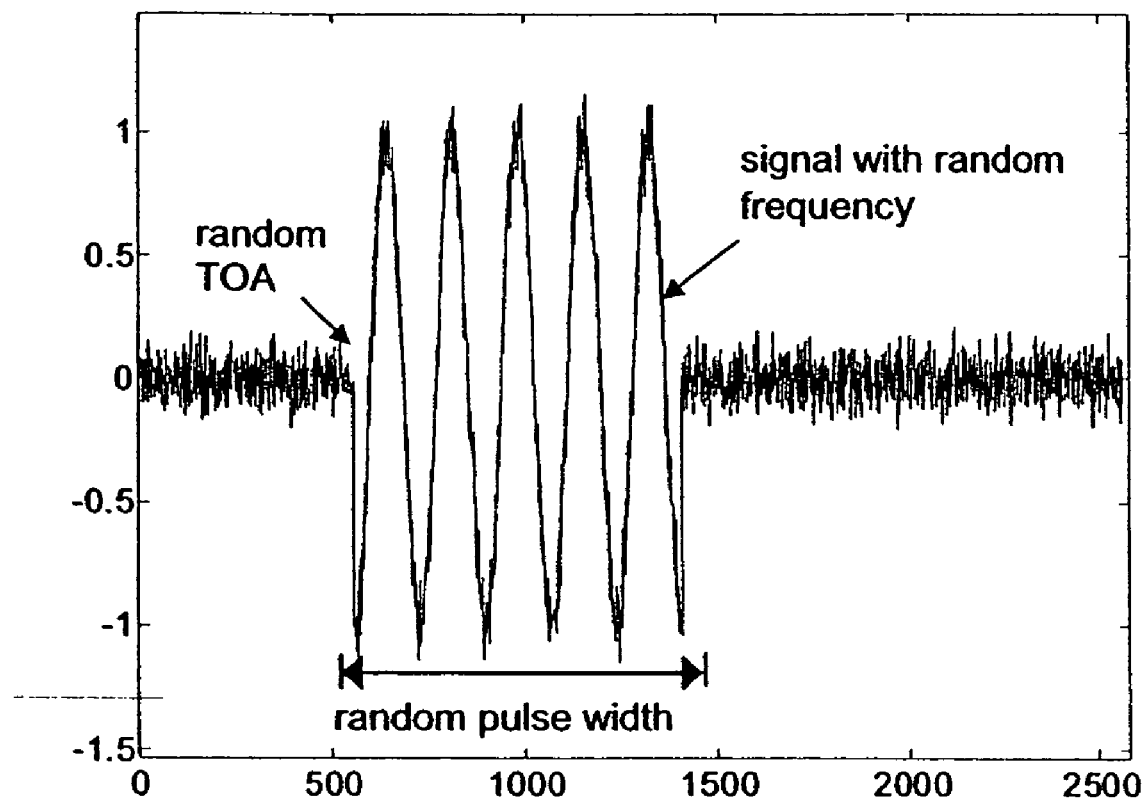
FIG. 7 is a plot of amplitude versus time of an exemplary pulse of a received signal having a random frequency.

Referring next to FIGS. 5 and 6, there is shown an exemplary method of the present invention, generally designated as 50. As shown, step 52 receives the input signal and partitions the input signal into a predetermined number of sampling points. As an example, step 52 receives 2560 sampling points, which include 2560 noise samples and a signal having (1) a random input frequency, (2) a random time-of-arrival (TOA) leading edge pulse and (3) a random pulse width. It will be appreciated that this received signal was used in a simulation for testing the method of the present invention. The received signal is shown in FIG. 7.

Step 54 divides the received 2560 point samples into 10 equal sections. Each section is comprised of 256 sample points, as shown in FIG. 6. It will be understood that FIG. 6 shows a complete 256 point section as zi(k), which has four blocks. FIG. 6 also includes a portion (two blocks) of another 256 point section as zi(k−1), and a portion (two blocks) of yet another 256 point section as zi(k+1). As shown, each 256 point section is further partitioned into four fine sections, where each fine section represents a block of sampled data which is 64 sampling points. In a similar manner, FIG. 3 shows blocks of data, where each block of data is comprised of 64 sampling points.

Returning to FIG. 5, method 50 enters two different loops by way of decision block 56 and decision block 58. The loops are repeated for all values of k from k equal to 1 up to 10. In this manner, the method examines the entire received signal of 2560 sampled points.

If the leading edge of the received pulse is not found, as determined by decision box 58, the method loops to the right side of FIG. 5, in which the method is attempting to estimate the frequency (step 62), confirm the frequency (steps 66, 70 and 74) and find the leading edge of the pulse (step 80) defined as the time-of-arrival (TOA) of the received signal.

As shown, step 62 finds the estimated frequency, $f_e$, of section zi(k). As previously described with respect to FIG. 3, the method estimates, or measures a frequency using 256 sample points. Accordingly, using the 256 point section of zi(k), the method estimates frequency $f_e$. This frequency $f_e$ is next used to confirm the signal. In order to declare a signal, the method examines six 64 point sections, from z_fine(1) up to z_fine(6). Accordingly, kk sequences from 1 to 6, as controlled by decision box 66, while the method enters step 70 and computes $c_{kk}$, $c_{kk+1}$, and $c_{kk+2}$. Each confirmation value, $c_{kk}$, is a discrete Fourier transform (DFT) of a 64 point section of z_fine (kk). For example, the confirmation value, $c_{kk}$, has the following expression:

$$c_{kk} = \sum_{n=0}^{63} z\_fine(kk) \cdot e^{-j \cdot 2\pi \cdot fe \cdot ts \cdot n}$$

The method then enters decision box 74 and determines if $c_{kk}$ is greater than the first threshold value, and also determines if the subsequent confirmation values of $c_{kk+1}$ and $c_{kk+2}$ are greater than the second threshold value. It will be appreciated that, as an example, the first threshold value may be set to a value of approximately 38 and the second threshold value may be set to a lower value of approximately 31.

If decision box 74 determines that the first threshold and the second threshold have both been exceeded, then the method enters step 80 and determines that the leading edge of the pulse (the TOA) may be found by moving two fine sections (1−3=−2) to the left, as indicated in FIG. 6.

Returning to decision box 58, if the leading edge of the pulse (the TOA) has been found, the method branches to step 60. The method now proceeds to find the trailing edge of the pulse (the TOD). Accordingly, step 60 divides zi(k) into four 64 point sections and separately examines each of these four 64 point sections, as controlled by decision box 64. For each of the four 64 point sections, step 68 finds a DFT value.

Decision box 72 then determines whether this DFT value is smaller than the second threshold (for example 31). As long as the DFT value of the 64 point section is greater than the value of the second threshold, the method determines that the pulse is still present and, therefore, keeps trying the next 64 point section. When, on the other hand, decision box 72 determines that the DFT value of the present 64 point section has fallen below the second threshold value, the method enters step 76. The trailing edge of the pulse is determined to have occurred, by step 76, within this present 64 point section. The method then enters step 78 and calculates the pulse width, which is equal to the TOD minus the TOA.

The method 50, shown in FIG. 5, has been tested by the inventors by using one input signal. As described above, the input signal has a total of 2560 data to points and among these data points, there is a pulse having a pulse width randomly chosen between 512 to 1280 points (as shown in FIG. 7).

For each simulated run, the signal-to-noise ratio (S/N) was fixed, but the signal frequency and the initial time of the pulse were kept as random values. The frequency ranged between 80 MHz to 2480 MHz and the initial time of the pulse ranged between 0 to 1000 point, as shown in FIG. 7.

During the tests, the threshold found from noise alone is about 38 and is used until the first signal is confirmed in a block of 64 points; the following blocks, after the signal is confirmed, use a threshold that is decreased by 1.78 dB to about 31. Both the monobit Kernel function with only four values ±1 and ±j, and the regular Kernel function from $\exp(-j2\pi f_o n/N)$, where n=0~63 and N=64, were used in the tests.

One thousand simulated runs, each run having a random time-of-arrival (TOA), pulse width, and frequency were used. The average and standard deviation of TOA error, and the average and standard deviation of pulse width error were calculated for the 1000 simulated runs. The percentage of TOA error greater than 25 ns was also calculated as a function of S/N. The results are listed in Tables 1 and 2.

tized Kernel functions are smaller than the confirmation values without using the digitized Kernel functions. Therefore, when the S/N is low, the TOA error is higher with the digitized Kernel function than it is without the digitized Kernel function, because some of the confirmation values do not exceed threshold.

Figure 9A:
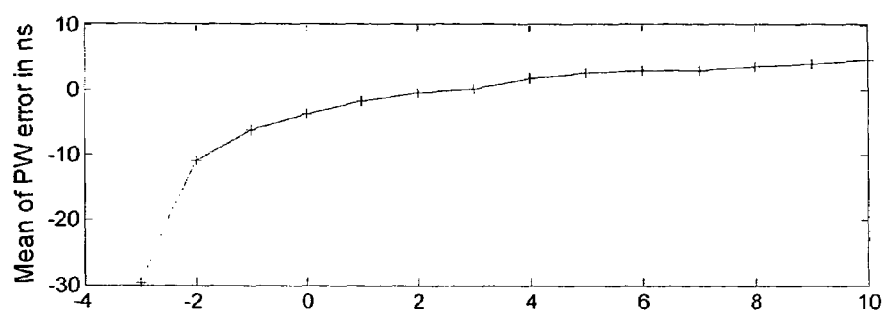
FIGS. 9A and 9B are plots of mean and standard deviation, respectively, of the pulse width error versus signal-to-noise ratio (S/N), showing results of simulation tests of the method shown in FIG. 5.
Figure 9B:
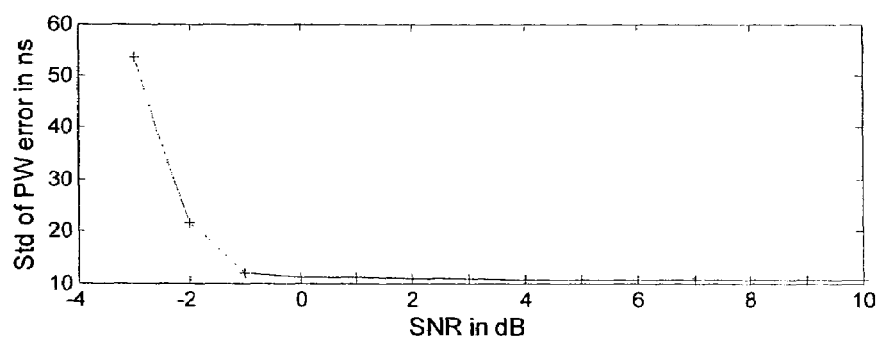

FIGS. 9A and 9B show the mean and the standard deviation of the pulse width error vs. S/N. As shown, when the S/N is low, the pulse width error is high.

Figure 10:
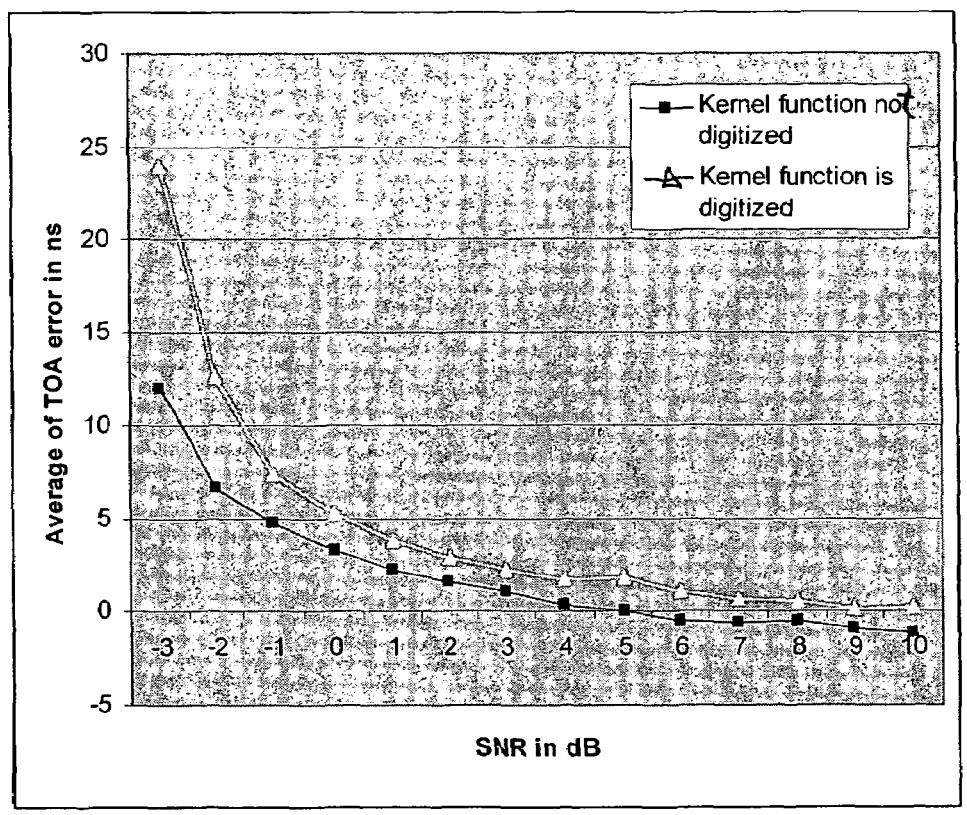
FIG. 10 is a plot of the average of TOA errors versus signal-to-noise (S/N), showing results of simulation tests of the method shown in FIG. 5.

FIG. 10 shows the average of TOA errors versus S/N. As expected, the higher the S/N, the lower the TOA error. The confirmation values using the digitized Kernel function are smaller than the confirmation values without the digitized Kernel function. Therefore, when the S/N is low, the TOA error is higher with the digitized Kernel function than without the digitized Kernel function, because some of the confirmation values do not exceed the threshold.

Figure 11:
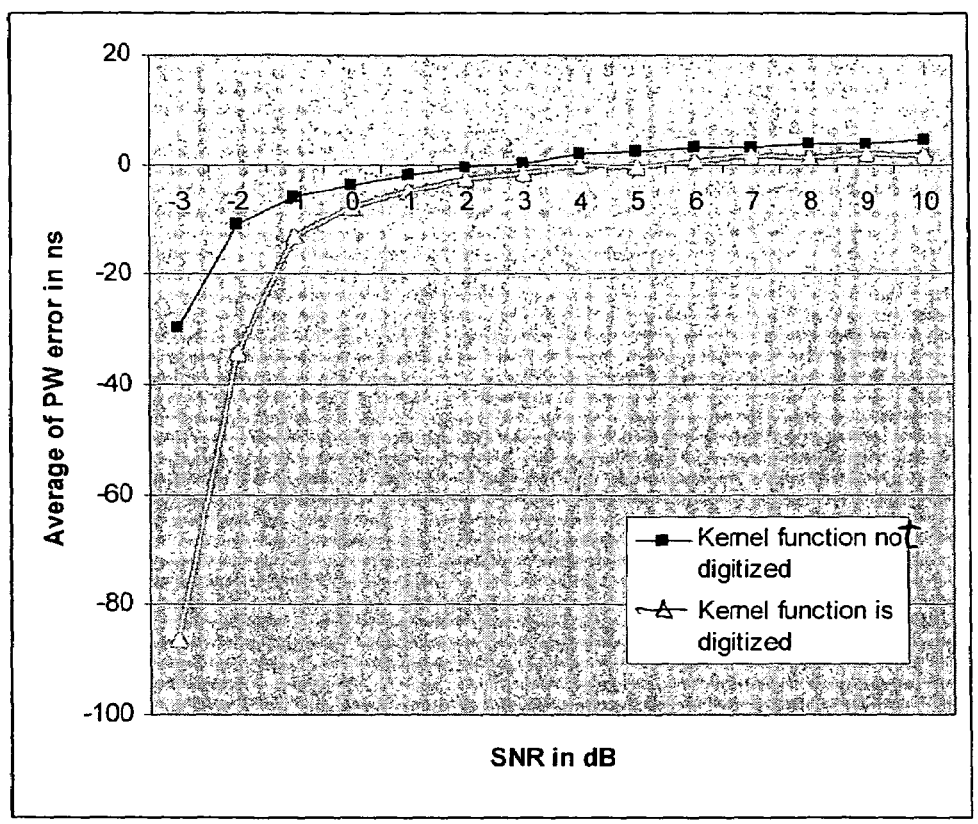
FIG. 11 is a plot of the average of PW errors versus signal-to-noise (S/N), showing results of simulation tests of the method shown in FIG. 5.

FIG. 11 shows the average of PW error in nanoseconds versus S/N. When the S/N is low, the pulse width error is high.

Figure 12:
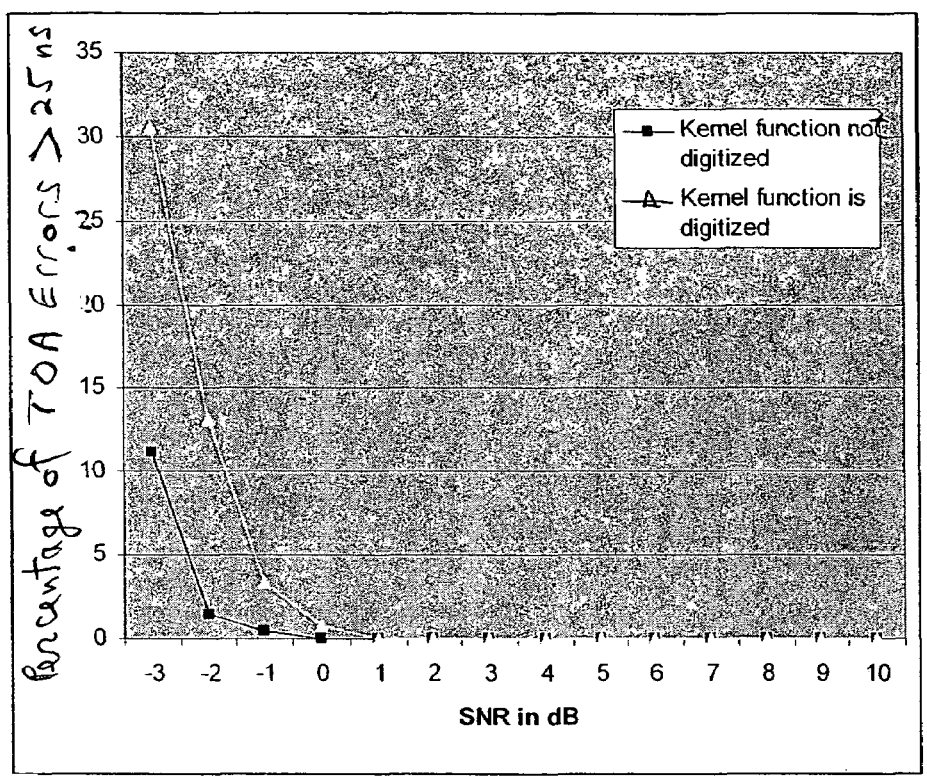
FIG. 12 is a plot of percentage of time-of-arrival (TOA) errors greater than 25 ns versus signal-to-noise ratio (S/N), showing results of simulation tests of the method shown in FIG. 5.

FIG. 12 shows the percentage of the runs in which the TOA errors are greater than 25 ns. When the S/N is 0 dB or above, the TOA may be accurately measured with a high percentage of TOA detection error within 25 ns.

When the S/N is lower than 0 dB, the signal is weak and the probability of DFT confirmations not crossing threshold is increased. Therefore, the TOA and the pulse width estimations are less accurate. When the S/N is low and the pulse width is short (less than 600 points or 235 ns), even if the estimated frequencies are accurate, the signal may be too

TABLE 1

A list of the data from the tests using non-digitized Kernel functions.

| S/N | % TOA >25 ns | TOA error (ns) | | | Frequency error (MHZ) | | | Pulse width error (ns) | | |
|---|---|---|---|---|---|---|---|---|---|---|
| | | mean | std | max | mean | std | max | mean | std | max |
| 10 | 0 | −1.15 | 7.57 | 19.53 | 0.017 | 0.43 | 1.76 | 4.59 | 10.63 | 30.86 |
| 5 | 0 | 0 | 7.58 | 16.02 | −0.006 | 0.40 | 2.01 | 2.53 | 10.61 | 29.69 |
| 3 | 0 | 1.09 | 7.88 | 18.75 | 0.01 | 0.44 | 2.26 | 0.22 | 10.9 | 30.47 |
| 1 | 0 | 2.20 | 7.96 | 19.53 | 0.008 | 0.61 | 2.67 | −1.77 | 11.20 | 30.08 |
| 0 | 0 | 3.25 | 7.84 | 19.92 | −0.01 | 0.73 | 3 | −3.65 | 11.22 | 30.08 |
| −1 | 0.4 | 4.78 | 8.04 | 42.58 | −0.031 | 0.85 | 4 | −6.04 | 11.85 | 61.33 |
| −2 | 1.4 | 6.68 | 9.14 | 87.11 | 0.03 | 1.07 | 6 | −10.83 | 21.64 | 316.41 |
| −3 | 11.2 | 12.03 | 16.84 | 121.48 | −0.006 | 1.27 | 5 | −29.61 | 53.60 | 423.83 |

TABLE 2

A list of the data from the tests using one-bit digitized Kernel functions

| S/N | % TOA >25 ns | TOA error (ns) | | | Estimated Frequency error (MHZ) | | | Pulse width error (ns) | | |
|---|---|---|---|---|---|---|---|---|---|---|
| | | mean | std | max | mean | std | max | mean | std | Max |
| 10 | 0 | 0.28 | 1.81 | 7.45 | −0.002 | 0.40 | 1.69 | 1.82 | 10.72 | 29.69 |
| 5 | 0 | 1.79 | 7.73 | 16.80 | −0.017 | 0.41 | 2.26 | −0.53 | 10.58 | 29.30 |
| 3 | 0 | 2.26 | 7.67 | 17.97 | 0.01 | 0.46 | 2.00 | −1.54 | 10.84 | 29.30 |
| 1 | 0 | 3.82 | 7.82 | 21.88 | 0.016 | 0.58 | 2.40 | −4.84 | 11.16 | 33.203 |
| 0 | 0.8 | 5.29 | 8.53 | 81.64 | 0.017 | 0.70 | 3.56 | −7.62 | 11.90 | 125.78 |
| −1 | 3.3 | 7.39 | 10.20 | 82.81 | −0.005 | 0.83 | 3.78 | −13.01 | 26.58 | 295.7 |
| −2 | 13.2 | 12.59 | 16.17 | 112.11 | −0.014 | 1.01 | 4.83 | −34.36 | 58.72 | 386.33 |
| −3 | 30.29 | 23.94 | 31.07 | 255.47 | 0.97 | 30.29 | 956.95 | −86.46 | 92.34 | 431.64 |

Figure 8A:
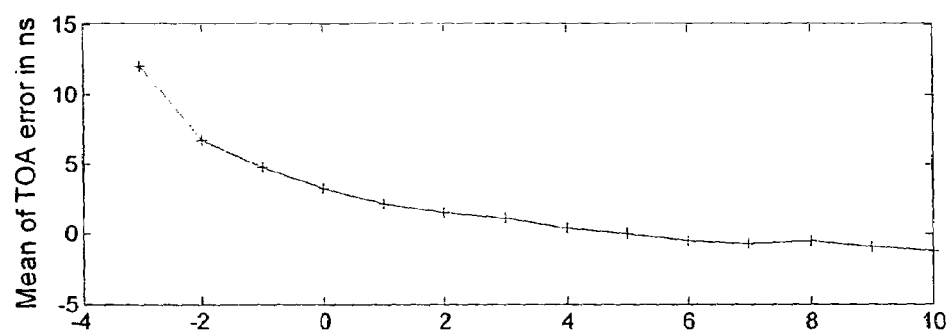
FIGS. 8A and 8B are plots of mean and standard deviation, respectively, of the time-of-arrival (TOA) error versus signal-to-noise ratio (S/N), showing results of simulation tests of the method shown in FIG. 5.
Figure 8B:
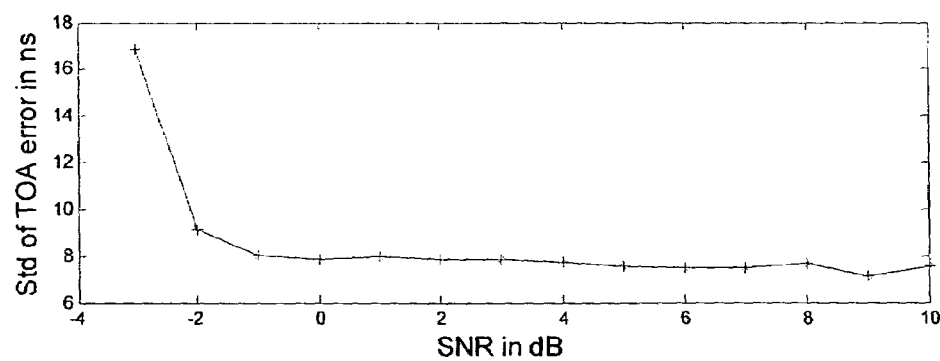

FIGS. 8A and 8B show the mean and the standard deviation of the TOA error vs. S/N. As expected, the higher the S/N, the lower the TOA error. The confirmation values using the digiweak to be confirmed and is likely to be missed. When the S/N is equal or greater than 1 dB, the results from the digitized and the not digitized Kernel functions are about the same.

In the above discussion, various examples are used to explain the concept of the frequency confirmation method, and the concepts of the TOA and the pulse width estimation methods. However, it is contemplated that other variations may be used either to simplify the actual design or to modify performance. For example, 128 sampling points rather than 256 sampling points may be used. Further, any number of DFT frequency components may be used, such as 1, 2, 3, etc. The first threshold value and the subsequent second threshold value may also be adjusted based on design performance. Furthermore, more than two predetermined threshold values may be used by the present invention. Specific performance requirements for a particular IFM is receiver may dictate which embodiment of the present invention is implemented.

What is claimed:

1. An apparatus for confirming a frequency of a received signal comprising:
    a receiver for measuring a frequency, $f_e$, of a received signal,
    a sampling module for sampling the received signal to form digital samples of data,
    a dividing module for partitioning the digital samples of data into blocks of data,
    a discrete Fourier transform (DFT) module configured to use a kernel function dependent on the frequency $f_e$,
    the DFT module configured to sum the digital samples of data disposed in a block of data and provide a magnitude, and
    a confirmation module for confirming the frequency, $f_e$, of the received signal, if the magnitude exceeds a predetermined threshold value;
    wherein the block of data is a first block of data, the magnitude is a first magnitude of data, and the predetermined threshold value is a first predetermined threshold value,
    the DFT module is configured to sum the digital samples of data disposed in a second and a third block of data following the first block of data and provide, respectively, a second magnitude and a third magnitude, and
    the confirmation module confirms the frequency $f_e$, if the first magnitude exceeds the first predetermined threshold, and the second and third magnitudes each exceeds a second predetermined threshold.

2. The apparatus of claim 1 wherein
    the DFT module is configured to obtain the magnitude of the sum of N-sample points of data disposed in the block of data, according to the following equation:

$$X(k) = \sum_{n=0}^{N-1} x(n) e^{-j\frac{2\pi kn}{N}}$$

where $k=f_e$
    n is an index for each digital sample, x(n) are input data points and
    N is the number of digital samples in the block of data.

3. The apparatus of claim 2 wherein
    the N-sample points includes 64-points of data.

4. The apparatus of claim 1 wherein
    the first predetermined threshold is larger than the second predetermined threshold.

5. The apparatus of claim 1 wherein
    the receiver is configured to estimate the frequency $f_e$ of the received signal in a duration of 4 times the duration of the N-sample points.

6. The apparatus of claim 5 wherein
    the N-sample points includes 64-points of data, and
    the receiver is configured to estimate the frequency $f_e$ in a duration of 256 sample points.

7. The apparatus of claim 5 wherein
    N-sample points includes one block of data,
    the receiver is configured to estimate the frequency $f_e$ in a duration of four blocks of data, the four blocks of data defined as a frequency calculation interval,
    the DFT module is configured to sequence through sequential blocks of data and obtain the magnitude of each of the blocks of data, and
    the first block of data in the sequence begins prior to the start of the frequency calculation interval.

8. The apparatus of claim 7 wherein
    the first block of data in the sequence begins two blocks of data prior to the start of the frequency calculation interval.

9. The apparatus of claim 8 wherein
    the received signal includes a pulse having a leading edge and a trailing edge, and
    if the confirmation module confirms the frequency $f_e$ at the start of the frequency calculation interval, then the leading edge of the pulse is defined to be present during a block of data that is two blocks prior to the start of the frequency calculation interval.

10. The apparatus of claim 9 wherein
    if the confirmation module does not confirm the frequency $f_e$ during one of the sequential blocks of data, after having confirmed the frequency $f_e$ prior to the one block of data, then the trailing edge of the pulse is defined to be present during the one block of data.

11. An instantaneous frequency measurement (IFM) receiver comprising:
    a receiver module for determining a frequency $f_e$ of a received signal,
    a discrete Fourier transform (DFT) module configured to sum values of digital samples of data in a block of data and provide a magnitude of the sum values, wherein the values of the digital samples of data are based on the frequency $f_e$, and
    a confirmation module for confirming the frequency $f_e$, if the sum has a value greater than a predetermined threshold;
    wherein the block of data is a first block of data, the magnitude is a first magnitude of data, and the predetermined threshold value is a first predetermined threshold value,
    the DFT module is configured to sum the digital samples of data disposed in a second and a third block of data following the first block of data and provide, respectively, a second magnitude and a third magnitude, and
    the confirmation module confirms the frequency $f_e$, if the first magnitude exceeds the first predetermined threshold, and the second and third magnitudes each exceeds a second predetermined threshold.

12. The IFM receiver of claim 11 wherein
    the DFT module is configured to obtain the sum of N-sample points of data disposed in the block of data, according to the following equation:

$$X(k) = \sum_{n=0}^{N-1} x(n) e^{-j\frac{2\pi kn}{N}}$$

where $k=f_e$, n is an index for each digital sample, x(n) are input data points and N is the number of digital samples in the block of data.

13. The IFM receiver of claim 12 wherein the DFT module is configured to sequence through sequential blocks of data and obtain the sum of N-sample points of data disposed in each of the sequential blocks of data.

14. The IFM receiver of claim 13 wherein the received signal includes a pulse having a leading edge and a trailing edge, and if the confirmation module confirms the frequency $f_e$ at one of the sequential blocks of data, then the leading edge of the pulse is defined to be present in a block of data that is prior to the one of the sequential blocks of data, and if the confirmation module does not confirm the frequency $f_e$ during one of the sequential blocks of data, after having confirmed the frequency $f_e$ prior to the one block of data, then the trailing edge of the pulse is defined to be present during the one block of data.

* * * * *